March 14, 1944.  W. C. CORYELL  2,344,131
AIRFIELD
Filed Feb. 18, 1942  3 Sheets-Sheet 1
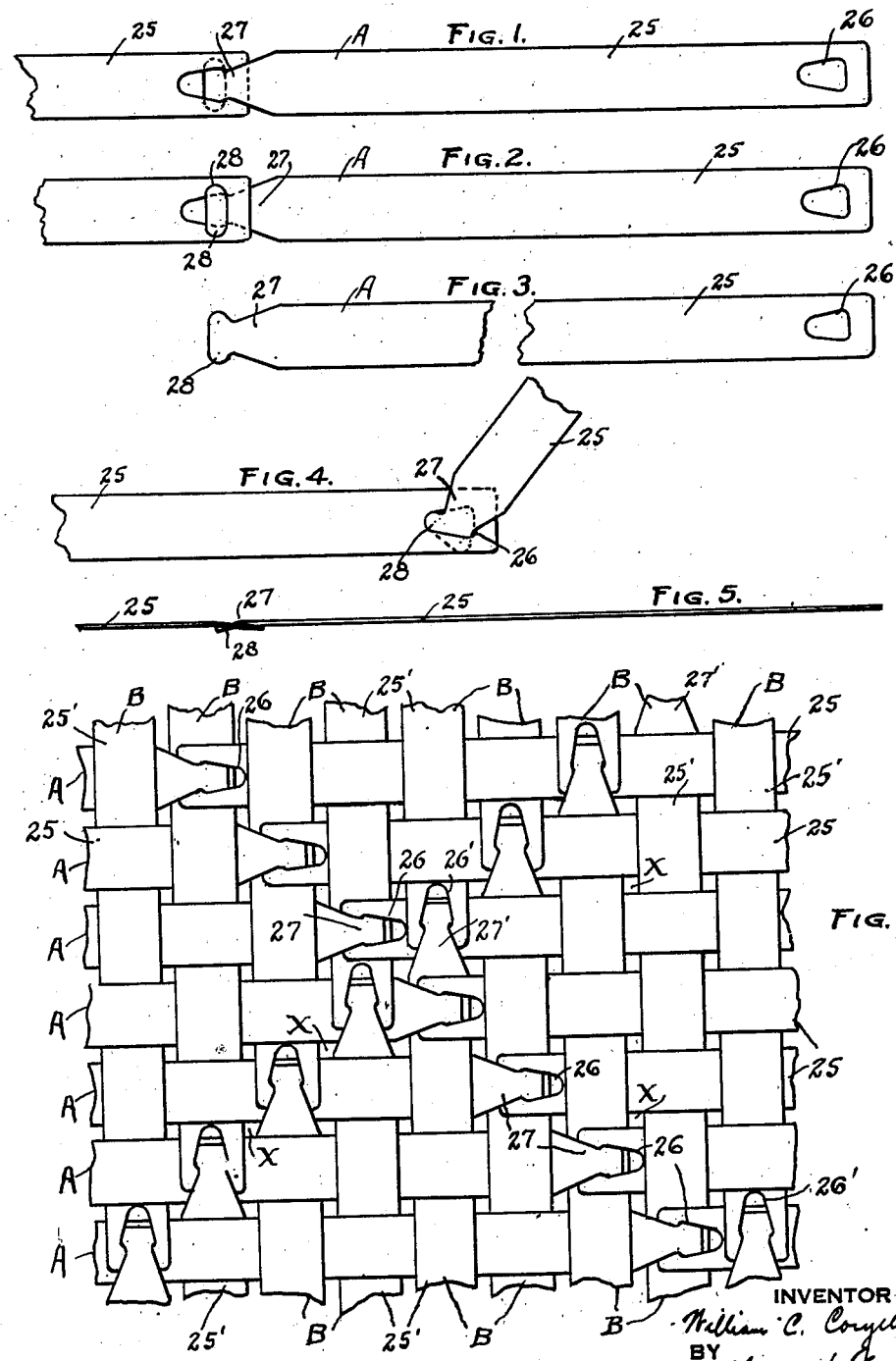

March 14, 1944. W. C. CORYELL 2,344,131
AIRFIELD
Filed Feb. 18, 1942 3 Sheets-Sheet 2
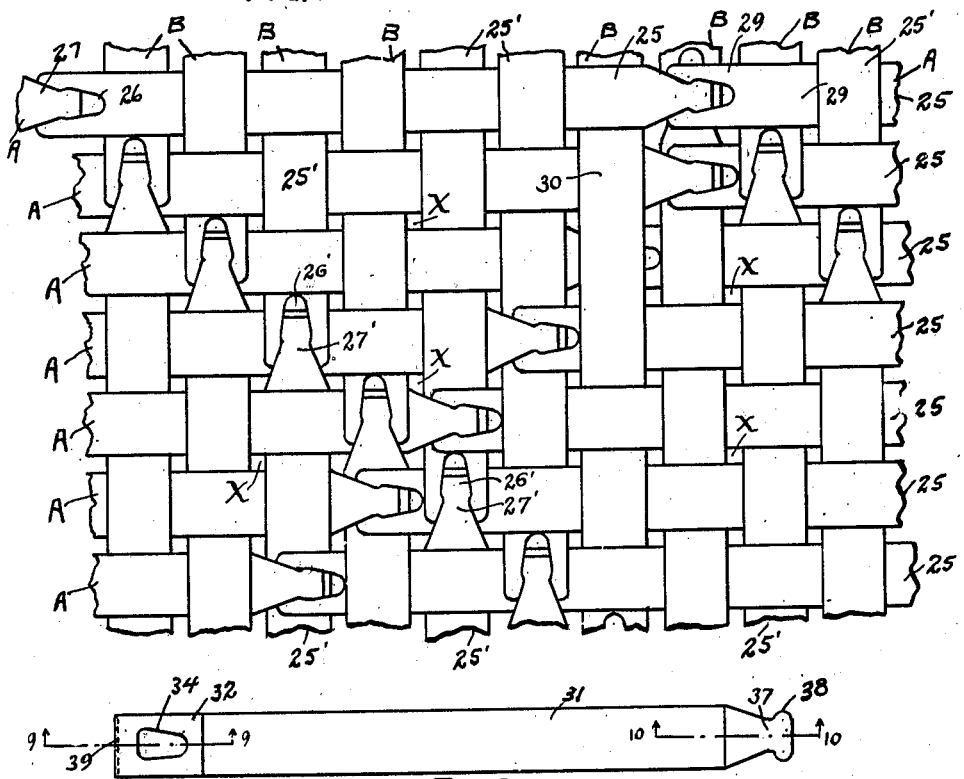
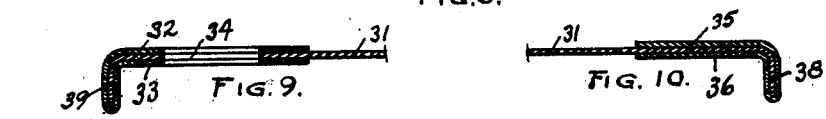
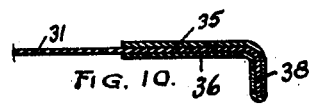
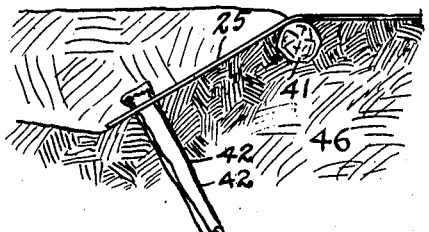
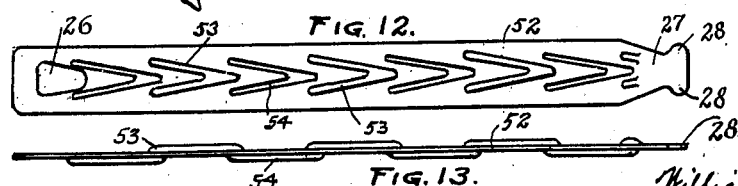
INVENTOR
William C. Coryell
BY
Thomas H. Ferguson
ATTORNEY March 14, 1944. W. C. CORYELL 2,344,131
AIRFIELD
Filed Feb. 18, 1942 3 Sheets-Sheet 3

INVENTOR
William C. Coryell
BY
Thomas H. Ferguson
ATTORNEY

Patented Mar. 14, 1944

2,344,131

UNITED STATES PATENT OFFICE 2,344,131

AIRFIELD

William C. Coryell, Youngstown, Ohio

Application February 18, 1942, Serial No. 431,325

6 Claims. (Cl. 94—4)

The present invention relates to airfields such as used for the landing and taking off of airplanes in out-of-the-way places and which are therefore of a temporary nature.

One object of the invention is to provide a novel airfield which shall be light yet durable. To this end I employ strips of metal and weave them together with sort of a basket weave and then hold the same around the outside by attachment to the ground, so that any stress which may be applied to the field will be resisted by the strips in tension rather than in bending.

Another object is to provide metal strip units which may be of a uniform size, or sizes, and then interlock these units end to end to provide a long composite strip for the weaving operation.

Another object is to provide a novel lock between the units when thus positioned end to end, one by which the units may be fitted together when positioned at a substantial angle to each other but locked when straightened out into alinement.

Another object is to provide a field which may be patched easily. Since the same is for the use of the army and navy it may be that a hole will be blown in the field by a bomb. When this occurs the hole can be readily trimmed out and repaired with a patch. This patch comprises warp and woof strips which are interwoven the same as the main field. It is placed over the hole in the main field and secured at its edges.

Another object is to so weave the field that the joints in the warp strips will never register with the joints in the woof strips. In other words, there will never be one joint directly above another when the field is regularly woven. Thus, the joint being the weakest point in the strip will never lie directly over another joint. Consequently, the field will be kept at its maximum strength. The worst that can ever happen will be four joints adjacent to each other.

Still another object is to reinforce the ends of the strips where the same are secured to the anchoring means. Likewise the strips may be reinforced where subjected to excessive transverse strains.

The various objects, features and advantages of the invention will be best understood upon reference to the following detailed description taken in connection with the accompanying drawings, while the scope of the invention will be particularly pointed out in the appended claims.

Figure 14:
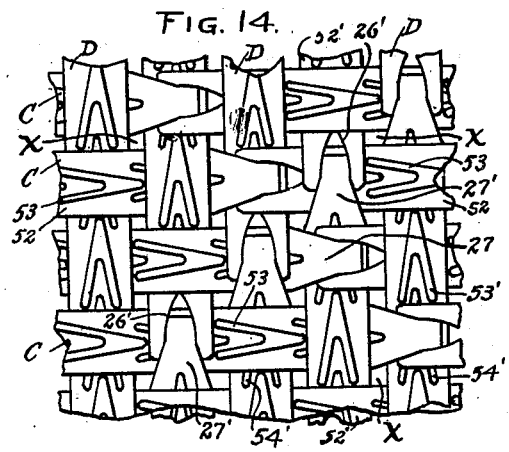
Figure 15:
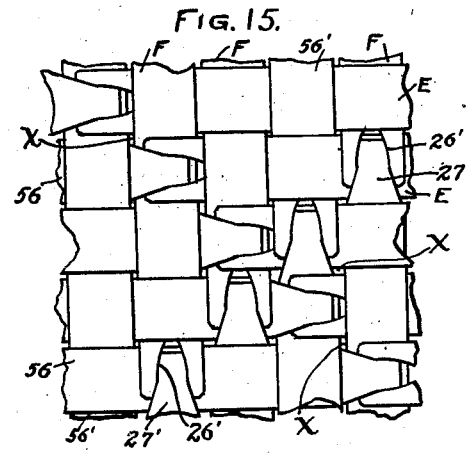
Figure 16:
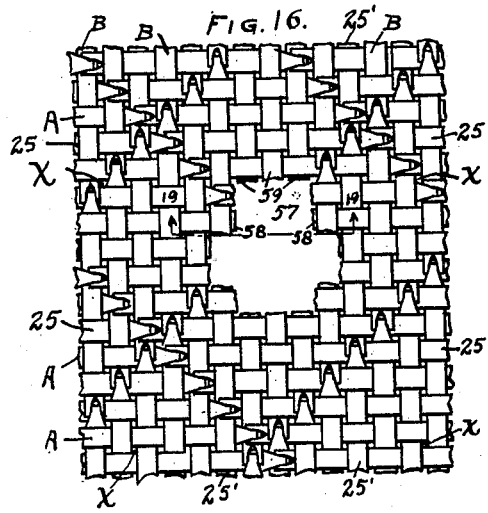
Figure 17:
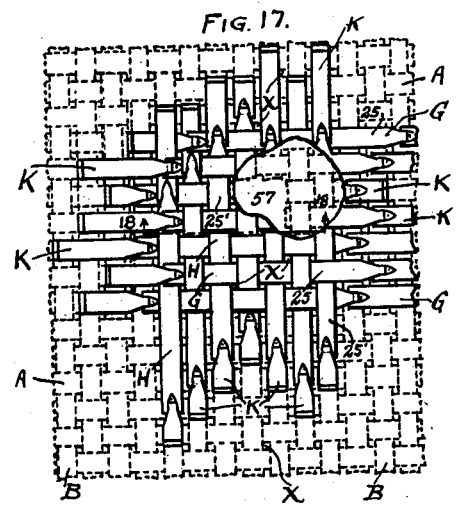
Figure 23:
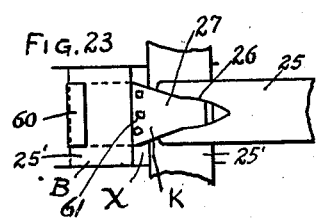
Figure 18:
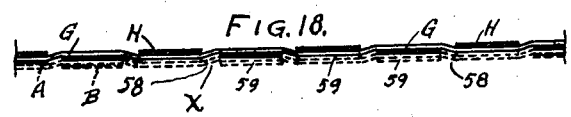
Figure 20:
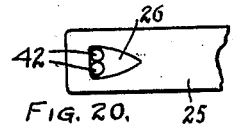
Figure 19:
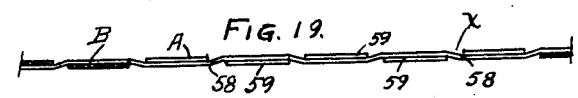
Figure 21:
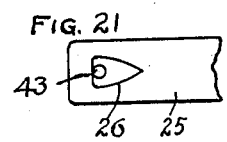
Figure 22:
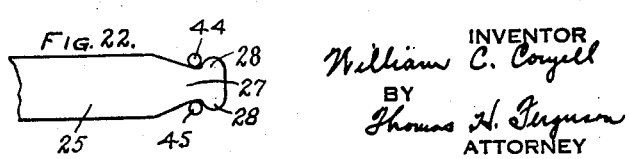

In said drawings, Fig. 1 is a top view of a portion of a constituent strip in plan, showing how one component unit is interlocked with an adjacent unit. Fig. 2 is a bottom plan view of the same. Fig. 3 is a plan view of a strip, whether short or long. Fig. 4 is a view illustrating the way in which the head or tongue is passed into the opening of the adjacent unit, when at an angle thereto, and before the units are straightened out. Fig. 5 is a side elevation of that portion of the strip shown in Fig. 1. Fig. 6 is a plan view of a portion of the woven carpet or mat. Fig. 7 is a similar view, but shows places where the workman made mistakes in weaving the strips. Fig. 8 is a plan view of a unit having reinforced ends. Fig. 9 is a longitudinal section on an enlarged scale illustrating the reinforcement at the apertured end, the plane of section being indicated by the line 9—9 of Fig. 8. Fig. 10 is a similar section at the opposite end, also upon an enlarged scale, the plane of section being indicated by the lines 10—10 of Fig. 8. Fig. 11 is a view illustrating a method of anchoring the strips. Fig. 12 is a plan view of a reinforced unit having ribs along its upper and under sides. Fig. 13 is a side elevation of the same, the depth of the ribs being exaggerated for clearness. Fig. 14 is a plan of a portion of the metal carpet made up of ribbed strips. Fig. 15 is a similar plan view of a mat having the openings between the strips reduced to a minimum. Fig. 16 is a plan view of a mat showing a hole in the interior of the mat trimmed away for a patch. Fig. 17 is a plan view of a portion of the mat of Fig. 16 shown in dotted lines and the patch in place thereon, shown in full lines, a portion of the patch being broken away to show the trimmed hole and a portion of the dotted original mat beneath. Fig. 18 is a transverse section of the same through the patch and the opening beneath it, the plane of section being indicated by the line 18—18 of Fig. 17. Fig. 19 is a similar view showing the mat without the patch but the hole trimmed for the same, the section being taken on the line 19—19 of Fig. 16. Fig. 20 is a plan view of one end of a unit, showing the pins by which it is secured to the terrain. Fig. 21 is a similar view showing a modified way of placing the retaining pin in position. Fig. 22 is a plan view of the opposite end of the unit showing the retaining pins there employed. And Fig. 23 is a plan view of an attaching device for securing the end of a patch strip to the main mat.

Throughout these views like characters refer to like parts.

At the outset, it may be noted that the portions of the strips, viewed in Figs. 1 to 5, inclusive, have their constituent units with the openings at the right hand end with the interfitting tongues at the left hand, whereas in the balance of the drawings they are reversed, that is to say, the tongues are on the right hand and the openings on the left hand. It will be noted that where plane material is used this is immaterial, for the reason that in assembling the composite strip the tongue may be passed through the opening from either side.

Referring to the drawings in detail, and at first to the crosswise strip, which constitutes a woof strip of the novel mat, it will be observed that each strip A may be a long individual strip or it may be a constituent strip made up of a plurality of units 25, which are shorter strips. This strip, whether constituting the entire strip or strip unit, is preferably composed of steel of a thickness of about one-sixteenth of an inch and a variable length and width. Preferably, the metal is a steel alloy which will withstand a great deal of tension and will readily yield to weaving.

Obviously, the strip A may be made any length, even to several hundred feet. This is when they are to be used alone. Where the width of the field is three hundred feet, they may be so used. For a narrower field a less length may be employed.

When the strip A is built up out of shorter component strips, these strips, too, may have a varying length. Each of the component strips or units 25 has a triangular opening 26 near one end and an attaching head or tongue 27 at the other. This head 27 is adapted to enter the triangular opening 26 of a companion unit. From the opposite sides of the tongue 27 extend lugs 28. These lugs 28 lie beneath the edges of the companion unit adjacent to the opening 26 when in assembled position. These several parts are all punched out of the original. It is one of the advantages of the present invention not to have much scrap. In the present case the scrap loss is about 4 or 5%, as compared with prior devices where the scrap loss is relatively heavy.

When two units are to be locked together they are first moved to a position about 45 degrees out of alinement. Then, with the tongue entering the opening 26 and the opposite end of the unit elevated, the lugs 28 may be passed into the triangular opening 26. Then, while in that position the two units are brought into alinement, in which position they are locked together and cannot be separated, except by the same movements in the reverse order. When in locked position the lugs 28 lie upon one side of the unit having the hole 26 and the rest of the unit lies upon the other side.

This is but one way of interlocking the units. Other ways may be used, as desired. The invention is capable of a wide variation in this respect.

Now, turning to the lengthwise strips B, it will be noted that they too may vary greatly in length. Ordinarily, a field three thousand feet long will take several. And they may be made in the same way as the strips A. It is because they occupy a different position in the mat than the strips A that they are differently designated. For convenience of reference, their parts are also designated by the same numerals as the parts of strips A, but the numerals are primed.

When making up the carpet or mat, the spliced composite strips B are placed side by side on the previously roughly leveled terrain. These are the warp strips. They are first interlocked end to end, or the interlocking may be done with laying them in this way. Then the second series of composite strips A, the woof strips, are interlocked end to end and are interwoven with the warp strips B.

This interweaving consists in passing a woof strip A below the first warp strip B, measuring from the left hand in Fig. 6 where the first example of interweaving is shown, over the second warp strip B, beneath the third warp strip B, over the fourth warp strip B, and so on throughout the length of the woof strip. The second woof strip A is similarly woven into position in the finished carpet by being passed over the first warp strip B, under the second warp strip B, over the third warp strip B, under the fourth warp strip B, and so on, through the length of the woof strip. Similarly with the other woof strips each alternating with the one preceding it.

When the carpet or mat is thus produced, it provides a relatively smooth surface for the take-off and landing of the planes.

A similar structure is shown in Fig. 7 where the mat is made up in the same way as the mat in Fig. 6 but in this instance two errors occur. One of these is indicated at the point 29. The error consists in positioning the top woof strip A one space to the left of where it should be to have the weaving regular. In other words, the error consists in positioning the top woof strip A too far to the left. Due to this improper placing, the joint between the two constituent units 25 of the strip, namely, the joint at the point 29, must overlie a joint between the components 25' of the third warp strip B, measured from the right hand edge of the carpet. Such in turn requires that the upper woof strip A shall be placed over three warp strips B instead of over one and then under the next, and finally the third, as would be the case were the weaving regular.

The second error is found at the point 30. There the third woof strip A failed to pass over the seventh warp strip as it should. This error in putting the pieces together need not interfere with the regular subsequent weaving of the strips since it is only necessary to go under the warp strip by the next woof strip when it is reached. In this way, the regular weaving of the two sets of strips may continue as before.

Thus, this figure shows that although the strands may in any given case be improperly laid, yet that it leaves the mat in pretty fair condition for the purpose intended.

Now, where the metal carpet is subjected to heavy loads, as would be the case with a heavy airplane landing upon it, the ends of the strip may require reinforcement against a longitudinal pull. For this purpose various forms of reinforcement may be employed. Thus, in Fig. 8 I have illustrated a strip unit 31 which is thus reinforced at its opposite ends. The reinforcement consists of a metal piece that is bent over the end of the unit and down at an angle thereto and back on the under side, all as illustrated at 39, in Fig. 9. The part of the metal which lies above is designated 32 and that which lies below is designated 33. All the parts may be thoroughly welded together and thus a substantial thickness for the triangular opening 34 provided. This unit may be first reinforced and then the opening 34 may be punched through the three thicknesses of metal or the parts may be separately punched and afterwards assembled.

In Fig. 10 the opposite end of the strip 31 is reinforced with similar metal 35 and 36 welded in place about the end of the unit and the forward end is also bent down so that the lug 38 has a substantial depth. The lugs 38 and 39 provide a substantial anchorage for the strip of which it forms a part.

In this way each constituent strip is strongly reinforced so as to take up extra strain upon the strip and also to furnish an anchorage which resists in like manner the shifting of the strip. These reinforced strips may be variously employed. Sometimes they will be used only at the ends of the runway. This will be where extra anchorage is required.

The ends of the composite strip may be secured to the terrain in various ways. Thus, the strip may be passed over or partially wrapped about a log 41 or other abutment and the ends secured to the adjacent ground by pins or other attaching devices. Thus, in the case of the unit 25 at the left in Fig. 11, the same may be secured by two pins 42, each passed through the triangular opening 26 in the manner illustrated in Fig. 20. Instead of two pins 42 a single pin 43 may be employed, as shown in Fig. 21.

At the opposite end, where the unit 25 is provided with the tongue 27, there are two pins 44 and 45. These pins pass so that the shanks closely press against the walls of the tongue behind the lugs 28 as clearly illustrated in Fig. 22.

These retaining pins 42, 43, 44 and 45 are preferably wooden pins as they will provide better anchorage in the soft ground where these landing mats are supposed to be used.

This abutment and the way of turning down the ends of the strip adjacent to it and fastening them to the earth 46 by the pins 42, 44 and 45 is merely illustrative.

Thus, it will be clear that, if the constituent strip units are all of the same length, then the ends of the same, when spliced as shown in Figs. 6 and 7, will extend beyond the mat different distances. When this is the case a single abutment may be provided for a set of the projecting ends or separate abutments may be employed. In each instance the constituent strip is firmly secured to the terrain. Indeed, it may be desirable to secure the ends of the strip in many other ways which will readily suggest themselves to workers in this art.

Where single strips A are used, as where they equal in length the width of the runway, then both ends may be provided, the one with a head 27 and the other with a triangular opening 26, just as in the case of the constituent unit strips 25, for anchoring purposes. Thus, in Fig. 3 such a strip is shown.

Now in some instances it may be desirable to provide a unit, such as the unit 52 in Fig 12, with projections 53 on one side and opposite projections 54 on the other side. These projections are V-shaped. They may be otherwise shaped if desired. They are also preferably struck up out of the metal of the strip. In Fig. 13 the projections 53 and 54 are shown higher than would ordinarily be the case, since a slight elevation would suffice. They may also be spaced in accordance with the width of the unit so that when assembling the strips they will readily seat themselves between these V-shaped projections. Thus the projections serve as spacers for the transverse strip. Although the unit 52 is provided with a triangular opening 26 at one end and a tongue 27 with laterally extending lugs 28 at the other, and no reinforcement of these is shown, yet it is clear that the same might be reinforced in the manner illustrated in Figs. 8, 9 and 10.

In Fig. 14, I have shown a mat composed of composite strips C and D which have been struck up with grooves on both sides, the same as shown in Figs. 12 and 13. The units 52 are linked together to form the woof strips C. They carry the oppositely disposed projections 53 and 54. Similarly the units 52' are linked together, if indeed the strip is composed of units, to form the strip D. They in turn carry the projections 53' and 54'. The projections are all V-shaped. When interwoven they provide a surface that is quite rough.

In Fig. 15 I have shown a mat wherein the interwoven strips E and F leave a minimum of space between the strips. This constitutes a close weave, in contrast to a loose or open weave. It results from drawing up the strips tighter than in the other mats, that shown in Fig. 14, for example. Here the woof strips E have the constituent units 56 and the warp strips F have the constituent units 56'.

Coming now to Fig. 16, I have represented a portion of an entire landing field which requires a patch in the interior. The opening might have been caused by a bomb from a plane or the like. If so, then the first thing to do is to fill in the hole made by the bomb. It should be filled and packed with new ground, or over-filled, before putting in the patch.

The next thing is to trim off the ends of the strips that are injured. It may be noted that where the mat has been bombed the ruptured strands will be torn and twisted in every imaginable way. Such twisted ends are sheared off, leaving more or less of a rectangular opening 57, as in Fig. 16. In the present case the trimming has occurred by cutting off the ends of both warp and woof strip units 25 and 25'. Thus the sixth woof strip A from the top is cut off at the right of the sixth warp strip B and at the left of the tenth warp strip B. The same is true of the seventh woof strip A measured from the top. When the eighth is reached it is cut off at the right of the fifth warp strip B and the left of the eleventh warp strip B. The same is true of the ninth woof strip A measured from the top. The last woof strip A to be cut is the tenth which is cut at the right of the sixth warp strip B and at the left of the tenth warp strip B. This takes care of all of the injured woof strips A.

The warp strips B may now be considered. The sixth from the left is cut off at the lower side of the seventh woof strip A and at the upper side of the tenth woof strip A. The three warp strips B which, measured from the left, are the seventh, eighth, and ninth, are all cut off at the lower side of the fifth woof strip A, measured from the top, and at the upper side of the eleventh woof strip B, measured from the top. The tenth warp strip B is cut off on the under side of the seventh woof strip A from the top and on the upper side of the tenth. This cares for all of the trimming.

It will be noted that in trimming for the opening 57, the seventh woof strip A, measuring from the top of Fig. 16, is cut off at the two points 58. Consequently, it is the fifth, not the seventh, woof strip that appears in Figs. 18 and 19. These latter views also show the ends of the intervening warp strips B that are cut off at 59.

When it comes to weaving the patch for the opening 57, it will be seen that the finished patch is composed of seven woof strips designated G and seven warp strips designated H. These warp and woof strips may be composite strips, and are so shown. The strips G are made up of components 25 and the strips H are composed of component strips 25'. These are interlocked at their ends in the manner shown. Obviously, long strips might be used without interlocking connections for the patch strips. The patch is made up by interweaving these strips as is done for the main mat. The interwoven portion is made sufficiently large not only to cover the hole 57 but to overlie the body of the mat about the hole to a reasonable extent. In addition, the strips G and H are made long so as to reach out over the body of the mat. When the mat has been prepared by trimming out the hole 57 then the woven patch comprising the strips G and H and their extensions are brought into position upon the field over the opening 57. The ends of the strips G and H are preferably secured directly to the body of the main field or mat. Various ways of securing the same in place may be employed.

For clearness in illustration, the main body of the mat is here shown in dotted lines, the parts comprising similar strips A and B, as before pointed out. The ends of the patch strips G and H may be variously connected to the main body of the mat. Indeed, many ways may be worked out for holding the patch in place. What I disclose is therefore merely illustrative. I do not wish to be limited thereto.

In Fig. 23 I have shown one way of attaching a strip, G or H, to an anchoring device by which it may be firmly secured to the main mat. One of the ends of a strip is cut off so as to provide an anchoring strip K. This is attached to the strip, say G, by means of the interhooking ends 26 and 27, or in case it is the reverse, then the end of the strip G would be provided with the hole 26 and the strip K with the tongue 27. In either event the two strips K and G are locked together at their meeting ends. The strip K has its opposite end bent upward two or three inches from the end to form a hook 60. This hook is bent up after being slipped under a transverse strip B of the main mat and is attached to the main unit by small tap bolts 61. By making the butt end of the strip K of proper length (depending upon the spacing of the strips of the main mat) the eye 26 of the strip will be spaced properly to hook into the first unit of the patch.

If the tap bolts are about .30 of an inch in diameter, they will screw into holes that may be produced by a rifle, in case an electric breast drill or like drilling device is not available.

When connection is to be made at the opposite end, the hook and eye will be interchanged in position, as before indicated.

As my material is of relatively thin gage and the tap bolts 61 are somewhat oversize, they will cut their own threads. With this arrangement the bolts 61 are subject to but infrequent uplifts, so that the simple device I have provided should serve the purpose.

A word may be said as to the regular weaving of the mat. If the pieces of strip are brought together to provide four contiguous joints, then the weaving is continued in regular fashion and there will be a field or mat woven after the manner of the parts in Fig. 6. And, as clearly shown, the starting point would be about the four joints formed by the third and fourth woof strips and the fourth and fifth warp strips, measuring from the top and from the left side of the figure. If the process of weaving is carried on regularly from this point there will always be a structure in which there are no joints overlapping, that is to say, there will never be one joint above another. The worst that will occur will be the four in proximity to each other, as stated before.

It is, of course, to be understood that the novel mat or carpet will sustain a certain weight in service. When that becomes excessive another carpet may be laid over the first, and thus the strength increased. Indeed, a multiplicity of carpets might be thus used.

Likewise, the spaces between the strips may furnish means for camouflaging. Thus, if through these openings, designated generally by the letter X, grass, flowers, weeds and the like are allowed to grow up, the runway will be camouflaged. Or, again, if desired, the surface of the mat itself may be camouflaged by painting on the mat either as originally prepared in the factory or after it is laid in the field.

From what has been disclosed it will be apparent that I have devised an airfield which is made of steel surfacing for an uneven or soft field where the army or navy wants planes to land. With this outfit the field may be laid down in possibly a day or two. Little leveling and clearing up need be done. The steel may be laid pretty much right upon the ground as it is.

It will be apparent too that I have made a composite member out of a plurality of strips which cannot be detached either by a thrust or by a pull. It will be apparent too that by having the woof and the warp strips at right angles to each other a substantially solid structure is provided.

Furthermore, when my mat is in use it will sustain the weight upon it by tension and not by bending resistance. It readily takes up the landing blow of a plane by tension.

The invention also has the advantage of being simple and not requiring a lot of small lugs which may become injured in shipping prior to assembly.

Although I employ rather a more expensive alloy steel, preferably Yoloy steel, yet I employ but a thickness of about one-half that of the nearest prior art devices. And my lack of wastage more than makes up for the extra cost. Then my product is about double the strength of the prior art devices. It is also free of holes, which greatly weaken the cross section where used.

It may be pointed out that I prefer a mat made of flat strips rather than ribbed strips. This is because in practice the whole thickness of the strip furnishes resistance to tensile stress. Thus, if instead of the ground being leveled and packed before laying, an ideal situation, the mat should be laid on rough and uneven ground, then the mat would have to bridge certain depressions. When it is thus bridged over a depression, it would be subject to tensile stress throughout its thickness and width, due to its extreme bending.

Now in case ribs are utilized in the strips forming the mat, then the ribs would help sustain the load during initial deflection; but as soon as the tensile stress increased enough so as to place all the rib in tension, then the only resistance to the beginning of a rupture would be offered by the fibers of the metal forming the tip of the rib. Then the rib does more harm than good, because the elastic stress in the lowest fiber is reached sooner than would be the case where it had less depth. Therefore, the total stress in the rib is greater than it would be, were the rib not formed and the original body of the strip were left to assume the tensile stress.

In many cases it may be well to have the constituent units cut to a given length, suitable for trucking, such as ten feet for example. Where they are to be made in great length, they may be shipped as coils.

It will, likewise, be apparent to those skilled in the art, that various other alterations and modifications may be made in the forms of the invention herein disclosed without departing from its spirit and scope. It is intended by the terms of the appended claims to cover these several alterations and modifications.

I claim:

1. A portable airfield comprising a series of composite thin steel strips laid side by side in substantially straight lines; a second series of like composite thin steel strips interwoven with said first series at substantially right angles thereto; said two series of strips providing a flat smooth surface for the take-off and landing of airplanes; said composite strips being made up of constituent units united end to end, one end of each unit having a locking slot therein and the other end forming a key member, said key member being free to enter the slot of an adjacent unit when said units occupy an angular position with reference to each other and to be locked when said members are subsequently moved into alignment with each other; said strips being thin enough to yield readily to the weaving of the strips, also being of substantially uniform width throughout their lengths and capable of withstanding a great tension, and said constituent units having lengths suitable for loading on a truck; and means for securing the free ends of the strips individually to the terrain to hold the strips in landing tension to receive the blows of the landing airplanes.

2. A portable airfield comprising a series of composite thin steel strips laid side by side in substantially straight lines; a second series of like composite thin steel strips interwoven with said first series at substantially right angles thereto; said two series of strips providing a flat smooth surface for the take-off and landing of airplanes; said composite strips being made up of constituent units united end to end, one end of each unit having a locking slot therein and the other end forming a key member, said key member being free to enter the slot of an adjacent unit when said units occupy an angular position with reference to each other and to be locked when said members are subsequently moved into alignment with each other; said strips being thin enough to yield readily to the weaving of the strips, also being of substantially uniform width throughout their lengths and capable of withstanding a great tension, and said constituent units having lengths suitable for loading on a truck; and abutments over the edges of which said strips are individually wrapped; and means for securing the ends of the strips to the terrain, whereby the landing tension delivered to the airfield by a landing plane is taken up partially by the abutments and partially by the securing means.

3. A patched airfield comprising a main field, means for securing the same at its edges to the terrain, a patch over a hole in the main field, and means for attaching said patch to said main field; said main field comprising a series of composite thin steel strips laid side by side in substantially straight lines, a second series of like composite thin steel strips interwoven with said first series at substantially right angles thereto, said two series of strips providing a flat smooth surface except for the hole within the same, said composite strips being made up of constituent units united end to end, one end of each unit having a locking slot therein and the other end forming a key member, said key member being free to enter the slot of an adjacent unit when said units occupy an angular position with reference to each other and to be locked when said members are subsequently moved into alignment with each other, said strips being thin enough to yield readily to the weaving of the strips, also being of substantially uniform width and capable of withstanding a great tension, and said constituent units having lengths suitable for loading on a truck; said securing means for securing the main field at its edges to the terrain comprising attaching devices individual to said strips; said patch being of sufficient size to overlie said hole and extend over a portion of the smooth surface of the main field, said patch being composed of interwoven steel strips extending at right angles to each other, said strips having the same characteristics and properties as the strips of the main field, and the strips of the patch and of the main field being of the same width and registering with each other; and the means for attaching said patch to said main field comprising individual anchoring devices at the outer ends of the patch strips to anchor said strips to the main field.

4. A patched airfield comprising a main field, means for securing the same at its edges to the terrain, a patch over a hole in the main field, and means for attaching said patch to said main field; said main field comprising a series of composite thin steel strips laid side by side in substantially straight lines, a second series of like composite thin steel strips interwoven with said first series at substantially right angles thereto, said two series of strips providing a flat smooth surface except for the hole within the same, said composite strips being made up of constituent units united end to end, one end of each unit having a locking slot therein and the other end forming a key member, said key member being free to enter the slot of an adjacent unit when said units occupy an angular position with reference to each other and to be locked when said members are subsequently moved into alignment with each other, said strips being thin enough to yield readily to the weaving of the strips, also being of substantially uniform width and capable of withstanding a great tension, and said constituent units having lengths suitable for loading on a truck; said securing means for securing the main field at its edges to the terrain comprising abutments over the edges of which said strips are individually wrapped, and devices at the ends of said strips for attaching the same individually to the terrain whereby the landing tension delivered to the main field by a landing plane is partially taken up by the abutments and partially by said devices; said patch being of sufficient size to overlie said hole and extend over a portion of the smooth surface of the main field, said patch being composed of interwoven steel strips extending at right angles to each other, said strips having the same characteristics and properties as the strips of the main field, and the strips of the patch and of the main field being of the same width and registering with each other; and the means for attaching said patch to the main field comprising individual anchoring devices each formed at the end of a patch strip and firmly secured to a strip of the main field extending at right angles thereto.

5. A portable airfield comprising a series of composite thin steel strips laid side by side in substantially straight lines; a second series of like composite thin steel strips interwoven with said first series at substantially right angles thereto, the strips of one series being pressed to form short upstanding projections along the length of the strip, said upstanding projections being spaced apart a distance slightly greater than the width of the strips of the other series, whereby said upstanding projections serve as spacers between strips of said second series, and said composite strips being made up of constituent units united end to end, one end of each unit having a locking slot therein and the other end forming a key member, said key member being free to enter the slot of an adjacent unit when said units occupy an angular position with reference to each other and to be locked when said members are subsequently moved into alignment with each other; said strips being thin enough to yield readily to the weaving of the strips, also being of substantially uniform width throughout their lengths and capable of withstanding a great tension, and said constituent units having lengths suitable for loading on a truck; and means for securing the free ends of the strips individually to the terrain to hold the strips in landing tension to receive the blows of landing airplanes.

6. A portable airfield comprising a series of composite thin steel strips laid side by side in substantially straight lines; a second series of like composite thin steel strips interwoven with said first series at substantially right angles thereto, the strips of one series having relatively short upstanding V-shaped projections thereon along the length of the strip, said short V-shaped projections being spaced apart a distance slightly greater than the width of the strips of the other series, whereby said upstanding projections serve as spacers between the strips of the second series, and said composite strips being made up of constituent units united end to end, one end of each unit having a locking slot therein and the other end forming a key member, said key member being free to enter the slot of an adjacent unit when said units occupy an angular position with reference to each other and to be locked when said members are subsequently moved into alignment with each other; said strips being thin enough to yield readily to the weaving of the strips, also being of substantially uniform width throughout their lengths and capable of withstanding a great tension, and said constituent units having lengths suitable for loading on a truck; and means for securing the free ends of the strips individually to the terrain to hold the strips in landing tension to receive the blows of landing airplanes.

WILLIAM C. CORYELL.